United States Patent
Xu et al.

(10) Patent No.: US 7,570,812 B2
(45) Date of Patent: Aug. 4, 2009

(54) SUPER PRECISION FOR SMOOTHLY CHANGING AREA BASED ON SEGMENTATION AND LOW-PASS FILTERING

(75) Inventors: Ning Xu, Irvine, CA (US); Yeong-Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 737 days.

(21) Appl. No.: 11/264,938

(22) Filed: Nov. 1, 2005

(65) Prior Publication Data

US 2007/0098293 A1    May 3, 2007

(51) Int. Cl.
*G06K 9/34* (2006.01)

(52) U.S. Cl. ............... 382/173; 382/264; 382/164; 382/240

(58) Field of Classification Search ............ 382/240, 382/173, 165, 166, 232, 233, 264, 140, 164; 324/307, 309; 600/410, 402, 587; 245/204; 348/751, 607, 701; 375/E7.051, E7.075, 375/E7.189; 708/315, 319
See application file for complete search history.

(56) References Cited

U.S. PATENT DOCUMENTS

| | | | |
|---|---|---|---|
| 4,646,754 A * | 3/1987 | Seale | 600/587 |
| RE34,663 E * | 7/1994 | Seale | 600/587 |
| 6,457,032 B1 * | 9/2002 | Silver | 708/315 |
| 6,949,928 B2 * | 9/2005 | Gonzalez Ballester et al. | 324/307 |
| 7,330,596 B2 * | 2/2008 | Suino et al. | 382/240 |

OTHER PUBLICATIONS

U.S. Appl. No. 11/106,812, filed Apr. 14, 2005, N. Xu et al.
R. W. Floyd and L. Steinberg, *An adaptive algorithm for spatial grey scale* in Proc. Soc. Inf. Display, 1976, pp. 75-77, vol. 17, No. 2.
R. Ulichney, *Dithering with blue noise*, in Proceedings of IEEE, Jan. 1988, pp. 56-79, vol. 76, No. 1.

* cited by examiner

*Primary Examiner*—Anh Hong Do
(74) *Attorney, Agent, or Firm*—Kenneth L. Sherman, Esq.; Michael Zarrabian, Esq.; Myers Andras Sherman LLP

(57) ABSTRACT

A super precision image processing system improves the precision of videos and images and eliminates the stage-like artifacts in the smoothly changing areas. In order to obtain higher precision content, the system segments the input image into connected segments and finds a local support for each pixel based on the segmentation result. The system then applies low-pass filtering to the local support for each pixel and the luminance changes between the filtering result and the original luminance of the pixel are limited to a level such that the output image will have the same higher bits as the input image.

18 Claims, 4 Drawing Sheets

Pixel (i,j)

Four neighboring
pixels of pixel (i,j)

Local segment

Local adjustment

Adjusted local segment

Current pixel

Current pixel

SUPER PRECISION FOR SMOOTHLY CHANGING AREA BASED ON SEGMENTATION AND LOW-PASS FILTERING

FIELD OF THE INVENTION

The present invention relates generally to video and image processing, and in particular to improving video content precision for smoothly changing areas.

BACKGROUND OF THE INVENTION

Video images and images often contain smoothly changing areas such as blue-sky background and shadings on the wall. In such areas, image luminance is changing gradually, which should be perceived as smooth areas. However, as images are stored digitally as pixels and the bit depth is limited, stage-like false contour artifacts may be perceptible in these areas.

To eliminate such artifacts, a higher precision content of the smoothly changing image area is needed. Once the higher precision content is obtained, the content can either be displayed on a higher bit depth display such that the steps between two consecutive luminance levels are too small to be perceptible, or a half-toning technique (e.g. super dithering) can be utilized to quantize the higher precision content to the display bit depth and remove the perceptual artifacts due to the spatial averaging characteristics of human visual system.

Either way, obtaining a higher precision content for the smoothly changing area is an essential step in removing the abovementioned perceptional artifacts. The conventional systems do not address such problems.

BRIEF SUMMARY OF THE INVENTION

In one embodiment, the present invention provides a super precision method and system, which first segments out the smoothly changing image content areas and then generates a higher precision image based on the segmented local support for each pixel within the smoothly changing image area. The higher precision is achieved based on the assumption that the segmented area is smoothly changing wherein a low-pass filter is applied.

As such, after segmentation which determines the smoothly changing areas, low pass filtering is applied to the segments to obtain the higher precision luminance values.

A super precision image processing system according to the present invention improves the precision of videos and images and eliminates the stage-like artifacts in the smoothly changing areas. In order to obtain higher precision content, the system segments then input image into connected segments and finds a local support for each pixel based on the segmentation result. The system then applies low-pass filtering to the local support for each pixel and the luminance changes between the filtering result and the original luminance of the pixel are limited to a level such that the output image will have the same higher bits as the input image.

Other embodiments, features and advantages of the present invention will be apparent from the following specification taken in conjunction with the following drawings.

DETAILED DESCRIPTION OF THE INVENTION

In one embodiment, the present invention provides a super precision method and system, which first segments out the smoothly changing image content areas and then generates a higher precision image based on the segmented local support for each pixel within the smoothly changing image area. The higher precision is achieved based on the assumption that the segmented area is smoothly changing wherein a low-pass filter is applied.

As such, after segmentation which determines the smoothly changing areas, low pass filtering is applied to the segments to obtain the higher precision luminance values.

Figure 1:
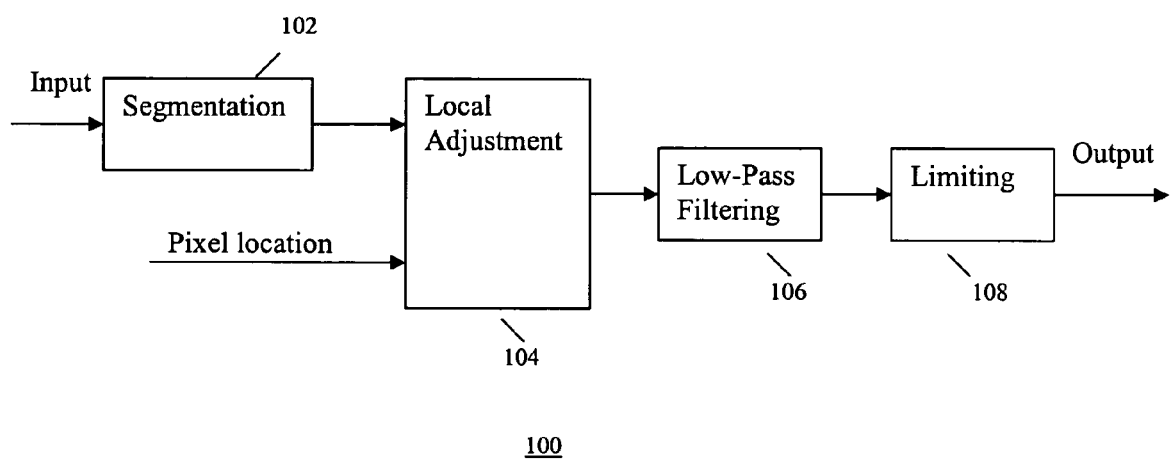
FIG. 1 shows a functional block diagram of a super precision image processing system according to an embodiment of the present invention.

FIG. 1 shows a functional block diagram of a super precision image processing system 100 implementing the super precision processing including segmentation and low-pass filtering according to an embodiment of the present invention. The system 100 includes a segmentation module 102, a local adjustment module 104, a low-pass filtering (LPW) module 106 and a limiting module 108. The input image is first segmented by segmentation module 102 and then a pixel's local support is found based on the segmentation result.

The local adjustment module 104 performs a local adjustment on the smoothly changing segment within a local rectangular window centered at the pixel of interest to make the adjusted segment symmetric about the pixel of interest, i.e., the center pixel of the window. The LPW module 106 then applies low-pass filtering to the adjusted segment, i.e., the local support of the pixel, followed by a limiting operation by the limiting module 108 which ensures that the pixel luminance change does not exceed one half of the smallest step of the original bit depth. A more detailed example operation of the system 100 is described below.

Segmentation

Figure 2:
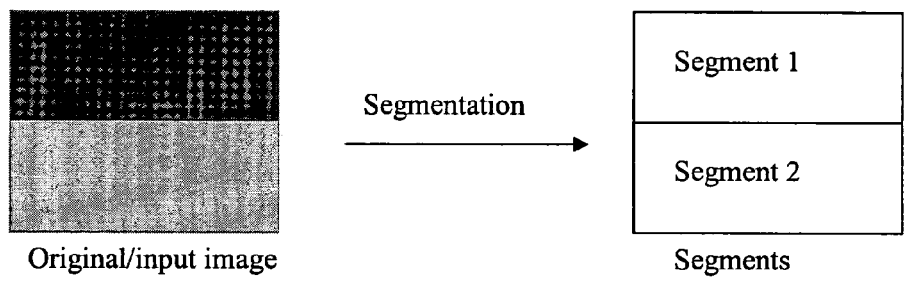
FIG. 2 shows an example of segmentation and segments, according to the present invention.

The segmentation module 102 segments the input image into a number of connected segments FIG. 2 shows a simple example of performing segmentation on an original/input image to obtain multiple segments (e.g., Segment 1, Segment 2) according to an embodiment of the present invention is shown in FIG. 2. Each of the segments contains a smoothly changing area of the input image. In general, neighboring pixels within a smoothly changing area should have a very small luminance difference, which should be much smaller than the smallest quantization level of the input image. However, because of the quantization, the luminance difference may jump by the smallest quantization step.

Figure 3:
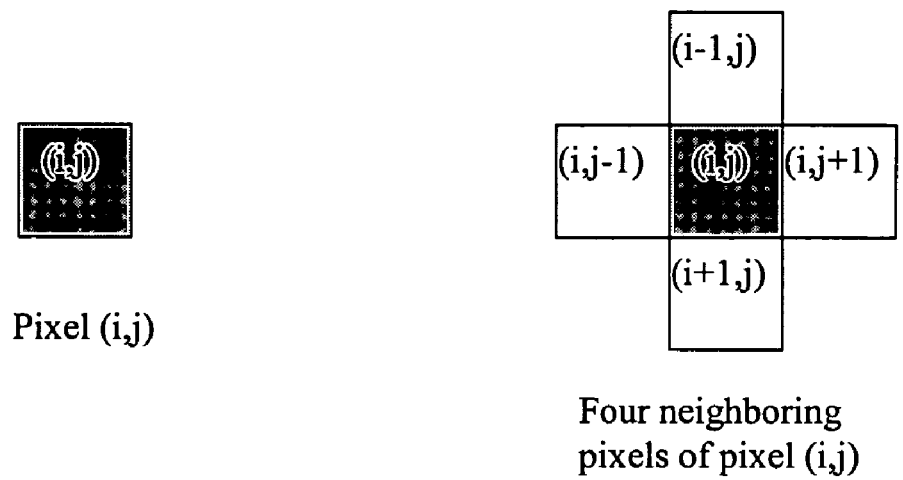
FIG. 3 shows an example of a 4-connection used to define neighboring pixels, according to an embodiment of the present invention.

Therefore, according to an embodiment of the present invention, two neighboring pixels are considered to be within the same segment if the luminance difference between these two pixels is less than the smallest quantization level. In this case, two pixels within the image are defined as in the same segment if and only if the two pixels can be connected through a set of neighboring pixels, whose luminance differences are all less than the smallest quantization level. This set of neighboring pixels forms a path connecting the two pixels. If there is no such path that can connect the two pixels, then these two pixels should then belong to different segments of the image. In one embodiment of the present invention, as shown by example in FIG. 3, a 4-connection is used to define neighboring pixels, wherein each pixel at row i, column j (i.e., location (i, j)) in the image has only four neighboring pixels at locations: (i−1, j), (i+1, j), (i, j−1), and (i, j+1).

One example implementation of the above embodiment in FIG. 1 for segmentation involves using a recursive algorithm. A function of checking the four neighboring pixels of a pixel is recursively called starting from a starting pixel, for example, the pixel on the first row and the first column. However, as each image contains a large number of pixels, the recursion algorithm may go very deep and cause the stack overflow error. To avoid the use of recursion and save memory and computing time, a stack is used in our algorithm, which is described as follows:

Algorithm 1:
1. Set an initial segment index, and push the upper left pixel into an empty stack.
2. If the stack is non-empty, pop out a pixel (i.e., current pixel) and mark it with the current segment index.
3. Check all unmarked neighboring pixels of the current pixel to determine if the luminance difference of an unmarked neighboring pixel and the current pixel is less than or equal to the smallest quantization level of the input precision, and then push the current pixel back into the stack.
4. Repeat step 2 until the stack is empty.
5. If there is still unmarked pixels, increase the segment number, push an unmarked pixel into the stack, go to step 3. Otherwise, go to step 6.
6. Terminate the algorithm.

The above algorithm uses stack and is much more efficient than the use of recursion. However, it still requires a segmentation of the whole image before applying low-pass filtering. In the hardware implementation of a real-time system, a full frame buffer is needed for this algorithm. To save the cost of using a frame buffer, the segmentation can be performed locally, wherein the stack algorithm above is applied to a local rectangular window centered at each current pixel (each pixel becomes the current pixel in iteration). In the examples described herein, the local window is square or rectangular, while local support may be any arbitrary shape according to the local image content.

Figure 6:
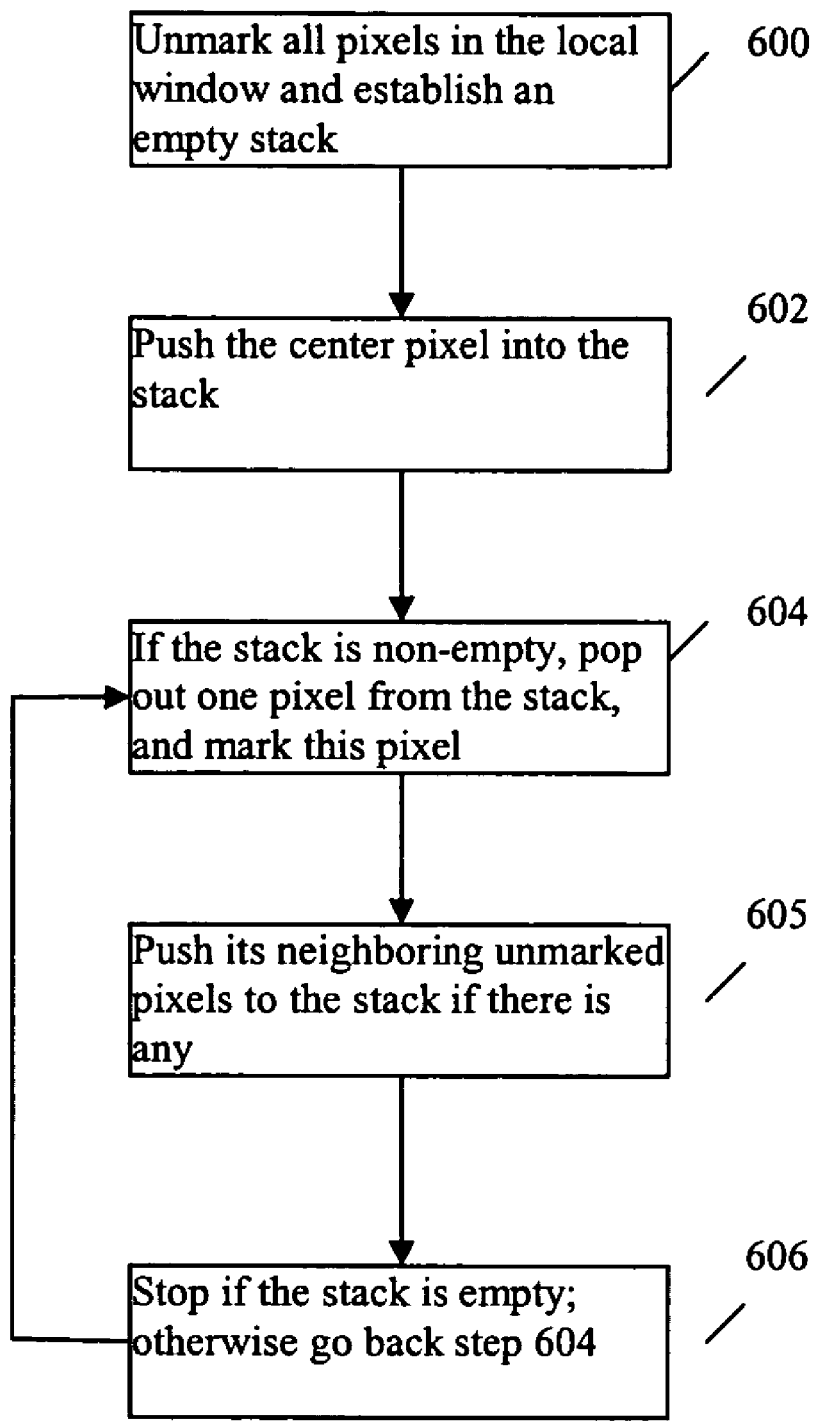
FIG. 6 shows a flowchart of example steps for modified segmentation algorithm for local window, according to an embodiment of the present invention.

In addition, as only the segment that contains the center pixel is considered, only one segment of the local window that starts from the center pixel is utilized (current pixel and center pixel are the same, as the local window is centered at the current pixel). Accordingly, an example modified segmentation algorithm for local window is described as follows in relation to the example flowchart in FIG. 6:

Algorithm 2:
1. Unmark all pixels in the local window and establish an empty stack (e.g., "0" and "1" are used for distinguishing purpose) (step 600).
2. Push the center pixel into the stack (step 602).
3. If the stack is non-empty, pop out one pixel from the stack, and mark this pixel (step 604).
4. Push its neighboring unmarked pixels to the stack if there is any (step 606).
5. Stop if the stack is empty; otherwise go to step 604 above (step 608).

For each pixel and a given local window centered at this pixel, a segment that contains this pixel can be found. This segment of pixels defines the smoothly changing area that must be identified before a higher precision luminance value can be determined for the center pixel.

Local Adjustment

As noted, the LPW module 106 applies low-pass filtering is applied to a segment containing the current pixel to obtain a higher precision luminance value for the pixel. However, if the current pixel does not lie at the center of the segment, the low-pass filtering might cause some problems. For example, if the current pixel lies to the left of an edge, then many pixels on the left of the current pixel would be included in the segment, whereas few pixels to the right of the current pixel would be included because of the edge. Therefore, preferably, the local adjustment module 104 performs a local adjustment on the segment within the local window before applying low-pass filtering, to make the segment symmetric about the current pixel.

Figure 4:
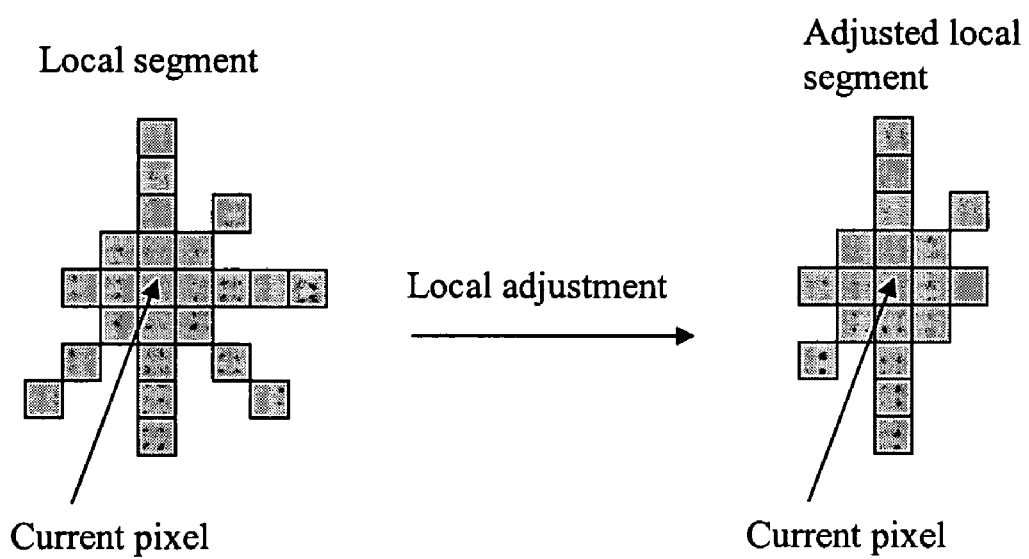
FIG. 4 shows an example of local adjustment according to an embodiment of the present invention.

An example of the local adjustment is now described. Let p(i, j) denote the current pixel, then each pixel p(k, l) in the local window is checked, wherein if p(k, l) does not belong to the segment then pixel p(2i−k, 2j−l) is removed from the segment if it belongs to the segment. After removing all the pixels whose corresponding pixel on the other side of the center pixel is not within the segment, an updated segment is obtained which is symmetric about the center pixel. This means that each pixel pair p(k,l) and p(2i−k, 2j−l) will be together, either in or out of the segment. A diagrammatical example of performing local adjustment on a local segment to obtain an adjusted local segment is shown in FIG. 4, according to an embodiment of the present invention.

The symmetric segment may become unconnected because of the removal of some non-symmetric pixels. A modified algorithm similar to the Algorithm 2 above is applied to check for connectivity only on the remaining pixels in the segment, described by example below. Assuming all the remaining pixels after the above local adjustment are marked as 1 and other pixels in the local window as 0, the modified algorithm includes the steps of:
1. Establish an empty stack.
2. Push the center pixel into the stack.
3. If the stack is non-empty, pop out one pixel from the stack and mark it as 2.
4. Push neighboring pixels which have been marked as 1, into the stack.
5. Stop if the stack is empty; otherwise go to step 3.

This results in a connected symmetric segment that is centered at the pixel of interest (i.e., center pixel). And this segment should represent a smoothly changing area. Thus, low-pass filtering can now be applied to the resulting segment to obtain a higher precision luminance value for the center pixel.

Low-Pass Filtering and Limiting

The above segmentation and local adjustment steps result in a segment of pixels that is centered at the pixel of interest. This segment of pixels is assumed to represent a smoothly changing area. For composite video images that consist of three components, either in RGB color space or YUV color space, the LPW module 106 applies low-pass filtering to each video component to obtain a set of higher precision values. However, in order to reduce hardware costs, low-pass filtering is preferably applied only to the luminance component Y of the pixels in the segment. In that case, only the luminance component of the pixels within the segment is needed.

The low-pass filtering method implemented in the LPW module 206 can be arbitrary. A simple example is using simple averaging of the pixels' luminance values within the segment as the output luminance value of the high precision pixel. Other low-pass filters can be used as well, for example, Gaussian filters with different variances, etc.

Preferably, the input image contains no noise and accurately represents the basic scene up to its precision. Therefore, after increasing the precision in the smoothly changing area, it is preferable that the output image have the same content as the input image. To achieve that result, the output luminance values are quantized to the input image precision by the limiting unit 108. In other words, the higher precision output is limited to a certain range around the input value as it is assumed that the lower precision version of the output should be same as the input.

Figure 5:
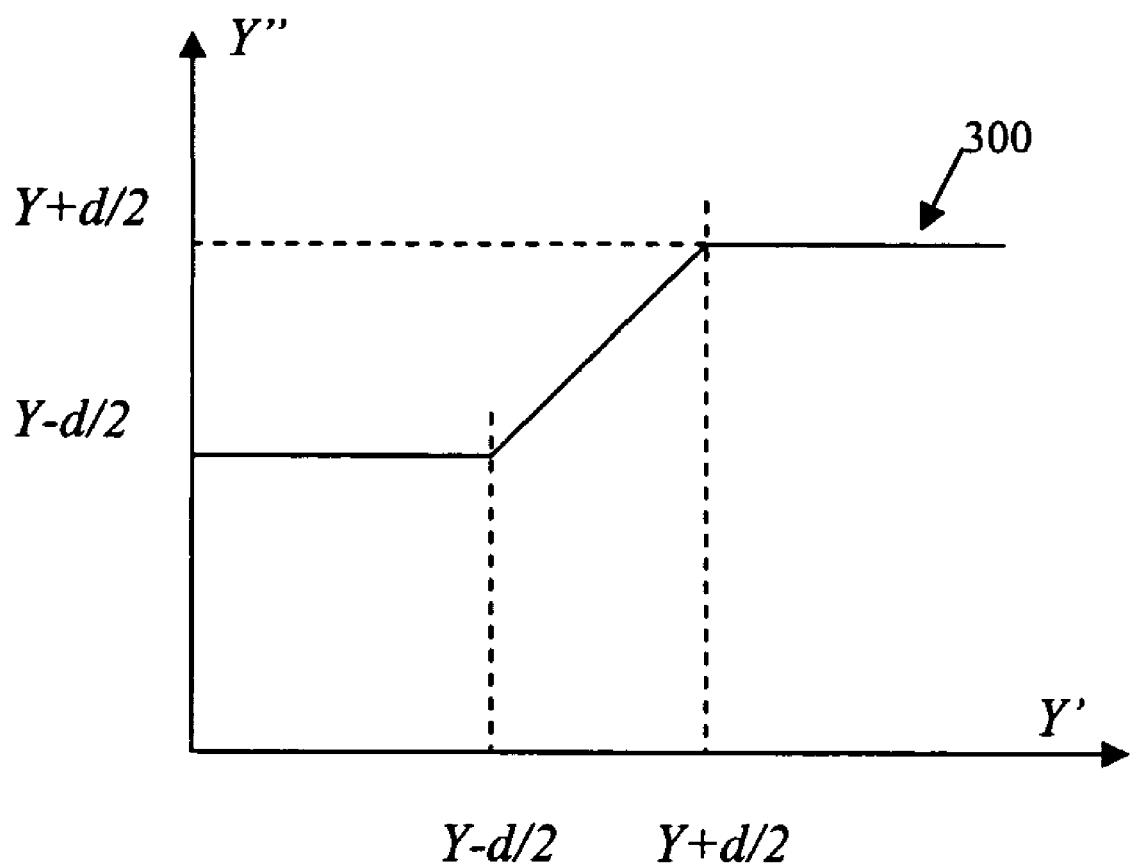
FIG. 5 shows an example of limiting mapping based on the original bit depth and the original luminance value, according to an embodiment of the present invention.

Let the smallest step of the original precision be d, the luminance of the pixel in the original image be Y, and the luminance of the pixel in the output image be Y'. The limiting unit 108 ensures that $|Y-Y'|<d/2$, by mapping the output image Y' to a final output image Y'' as $Y''=\min(\max(Y', Y-d/2), Y+d/2)$. FIG. 5 illustrates an example of a limiting mapping graph 500 between Y' and Y'', based on the original bit depth and the original luminance value. As those skilled in the art will recognize, other example mappings are possible.

Accordingly, the present invention improves the precision of videos and images and eliminates the stage-like artifacts in the smoothly changing areas of the images. In order to obtain higher precision content, a super precision system according to the present invention first segments the input image into connected segments and finds a local support for each pixel based on the segmentation result. The system then applies low-pass filtering to the local support for each pixel and the luminance changes between the filtering result and the original luminance of the pixel are limited to a level such that the output image will have the same higher bits as the input image.

While the present invention is susceptible of embodiments in many different forms, there are shown in the drawings and herein described in detail, preferred embodiments of the invention with the understanding that this description is to be considered as an exemplification of the principles of the invention and is not intended to limit the broad aspects of the invention to the embodiments illustrated. The aforementioned example architectures above according to the present invention can be implemented in many ways, such as program instructions for execution by a processor, as logic circuits, as ASIC, as firmware, etc., as is known to those skilled in the art. Therefore, the present invention is not limited to the example embodiments described herein. The present invention has been described in considerable detail with reference to certain preferred versions thereof; however, other versions are possible. Therefore, the spirit and scope of the appended claims should not be limited to the description of the preferred versions contained herein.

What is claimed is:

1. A method for digital image processing, comprising:
    employing a processor for:
        segmenting an input image into different segments of pixels, said segmenting including:
            segmenting a local window in the input image, wherein the local window is centered at a selected pixel;
            adjusting a segment to generate an adjusted segment that is symmetric about the selected pixel; and
        applying low-pass filtering to pixels in a segment to obtain a higher precision image.

2. The method of claim 1 wherein in the segmenting the input image further includes determining the pixels for each segment based on the luminance value of each pixel.

3. The method of claim 2 wherein the segmenting the input image further includes determining the pixels for each segment by computing the difference in luminance of a pixel and that of its neighboring pixels to determine the pixels for the same segment.

4. The method of claim 3 wherein the applying low-pass filtering to a segment to obtain a higher precision image further includes performing averaging of luminance values of the pixels in the local symmetric segment, to generate the higher precision image.

5. The method of claim 1 wherein the applying low-pass filtering to a segment to obtain a higher precision image further includes performing averaging of luminance values of the pixels in a segment, to generate the higher precision image.

6. The method of claim 1 wherein the applying low-pass filtering to the segment to obtain higher precision image further includes:
    performing low-pass filtering on the segment pixels to obtain a higher precision value for the luminance value of each pixel; and
    limiting the difference between luminance values of the pixels in the input image and pixels in the higher precision image.

7. The method of claim 6 wherein the limiting the differences between luminance values of the pixels in the input image and pixels in the higher precision image further includes ensuring that while truncating the pixel luminance values in the higher precision image to the original precision, the result is the same as the luminance value of the pixels of the input image.

8. A digital image processing system, comprising:
    a segmentation unit for segmenting an input image into different segments of pixels, the segmentation unit is configured to segment a local window in the input image, wherein the local window is centered at a selected pixel;
    an adjusting unit for adjusting the segment to generate an adjusted segment that is symmetric about the selected pixel; and
    a low pass filter for applying low-pass filtering to pixels in a segment to obtain a higher precision image.

9. The system of claim 8 wherein the segmentation unit further determines the pixels for each segment based on the luminance value of each pixel.

10. The system of claim 9 wherein the segmentation unit further determines the pixels for each segment by computing the difference in luminance of a pixel and that of its neighboring pixels to determine the pixels for the same segment.

11. The system of claim 8 wherein the low-pass filter applies low-pass filtering to a segment to obtain a higher precision image by performing averaging of luminance values of the pixels in the local symmetric segment, to generate the higher precision image.

12. The system of claim 8 wherein the low-pass filter applies low-pass filtering to a segment to obtain a higher precision image further includes performing averaging of luminance values of the pixels in a segment, to generate the higher precision image.

13. The system of claim 8 wherein:
    the low pass filter performs low-pass filtering on the segment pixels to obtain a higher precision value for the luminance value of each pixel; and the system further comprising limiting units for limiting the difference between luminance values of the pixels in the input image and pixels in the higher precision image.

14. The system of claim 13 wherein limiting units limits the differences between luminance values of the pixels in the input image and pixels in the higher precision image by ensuring that while truncating the pixel luminance values in the higher precision image to the original precision, the result is the same as the luminance value of the pixels of the input image.

15. A method for digital image processing, comprising:
employing a processor for:
  segmenting an input image into different segments of pixels; and
  applying low-pass filtering to pixels in a segment by performing averaging of luminance values of the pixels in the segment, to generate a higher precision image.

16. A method for digital image processing, comprising:
employing a processor for:
  segmenting an input image into different segments of pixels; and
  applying low-pass filtering to pixels in a segment to obtain a higher precision image, said applying low-pass filtering including:
    performing low-pass filtering on the segment pixels to obtain a higher precision value for the luminance value of each pixel; and
    limiting the difference between luminance values of the pixels in the input image and pixels in the higher precision image.

17. A digital image processing system, comprising:
a segmentation unit for segmenting an input image into different segments of pixels; and
a low pass filter for applying low-pass filtering to pixels in a segment by performing averaging of luminance values of the pixels in a segment, to generate a higher precision image.

18. A digital image processing system, comprising:
a segmentation unit for segmenting an input image into different segments of pixels;
a low pass filter for applying low-pass filtering to pixels in a segment to obtain a higher precision value for the luminance value of each pixel; and
limiting units for limiting the difference between luminance values of the pixels in the input image and pixels in the higher precision image.

* * * * *